United States Patent
Nanbara et al.

(10) Patent No.: US 8,881,393 B2
(45) Date of Patent: Nov. 11, 2014

(54) MANUFACTURING METHOD OF IMPELLER FOR FLUID TRANSMITTING DEVICE

(75) Inventors: Masaru Nanbara, Shizuoka (JP); Tetsuya Masuda, Shizuoka (JP)

(73) Assignee: Yutaka Giken Co., Ltd., Shizuoka (JP)

( * ) Notice: Subject to any disclaimer, the term of this patent is extended or adjusted under 35 U.S.C. 154(b) by 437 days.

(21) Appl. No.: 13/365,817

(22) Filed: Feb. 3, 2012

(65) Prior Publication Data

US 2012/0291280 A1    Nov. 22, 2012

(30) Foreign Application Priority Data

May 18, 2011  (JP) .................................. 2011-111097

(51) Int. Cl.
  *B21D 53/78*  (2006.01)
  *F16H 41/28*  (2006.01)
(52) U.S. Cl.
  CPC ....................................... *F16H 41/28* (2013.01)
  USPC ............. 29/889; 29/889.21; 29/530; 416/180
(58) Field of Classification Search
  USPC ............. 29/889, 889.2, 889.21, 527.1, 527.2, 29/530; 416/180
  See application file for complete search history.

(56) References Cited

U.S. PATENT DOCUMENTS 3,550,234 A * 12/1970 Werner ......................... 29/889.5
5,109,604 A *  5/1992 Koebele ....................... 29/889.5

FOREIGN PATENT DOCUMENTS

| CN | 201373080 Y | 12/2009 |
|---|---|---|
| CN | 101963220 A | 2/2011 |
| CN | 200989428 Y | 2/2011 |
| JP | 57-52262 | 3/1982 |
| JP | 05-014022 A | 1/1993 |
| JP | 05-185211 A | 7/1993 |
| JP | 07-054958 A | 2/1995 |
| JP | 2004-052936 A | 2/2004 |
| JP | 2008-82409 A | 4/2008 |

OTHER PUBLICATIONS

Ofice Action, Japanese Application No. 2011-111097, mailed Jun. 26, 2013.
Chinese Offfice Action issued Jun. 27, 2014; Application No. 201210025455.X.

* cited by examiner

*Primary Examiner* — Ryan J Walters
(74) *Attorney, Agent, or Firm* — Arent Fox LLP

(57) ABSTRACT

In a manufacturing method of an impeller for a fluid transmitting device, multiple guide grooves aligned in a peripheral direction to allow communication between adjacent ones of multiple positioning holes are provided in a concave inner surface of a core in advance; and in a step of melting a brazing material and causing the molten brazing material to penetrate into gaps between coupling pieces and positioning holes that are fitted to each other and further into gaps between the core and the blades, the molten brazing material is guided to the positioning holes through the multiple guide grooves. Accordingly, the step allows the molten brazing material to be efficiently guided to the gaps between the coupling pieces and positioning holes, thereby improving the yield of the brazing material and preventing an influence of a residual brazing material over the rotational balance of the impeller.

16 Claims, 7 Drawing Sheets

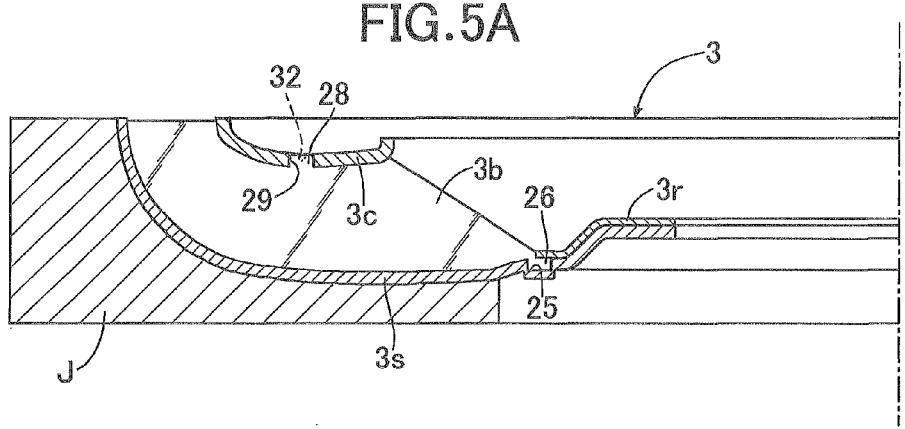
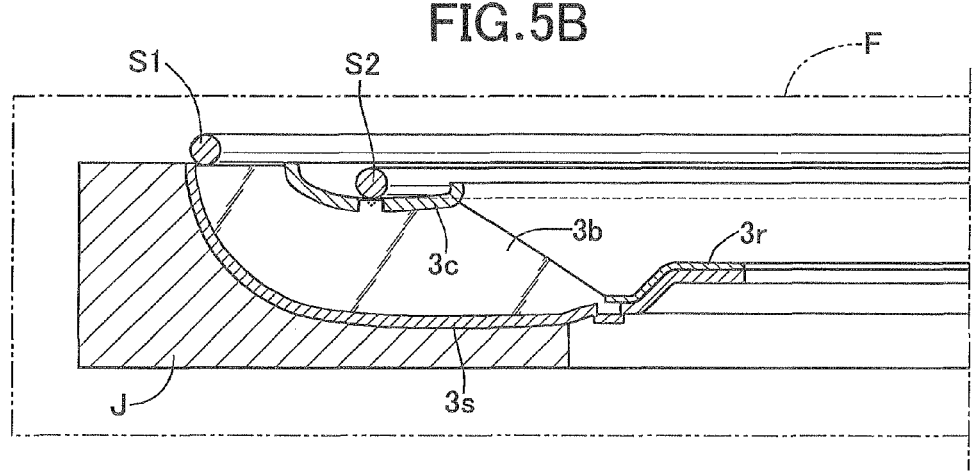
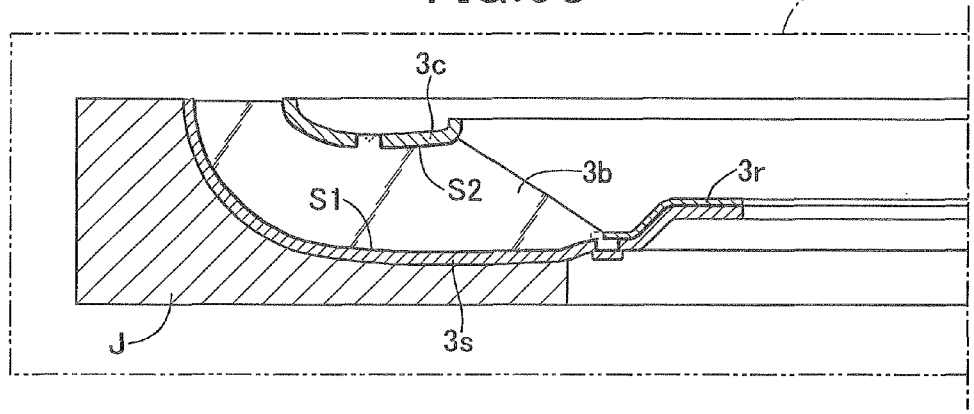

MANUFACTURING METHOD OF IMPELLER FOR FLUID TRANSMITTING DEVICE

BACKGROUND OF THE INVENTION

1. Field of the Invention

The present invention relates to a manufacturing method of an impeller for a fluid transmitting device such as a torque converter or a fluid coupling used in a vehicle or an industrial machine. The present invention relates particularly to an improvement in a manufacturing method of an impeller for a fluid transmitting device, the impeller including an annular, bowl-shaped shell, multiple blades joined to an inner surface of the shell and arranged in a peripheral direction of the shell, and a core having an outer peripheral surface brazed to an intermediate portion of each of the blades so as to couple the intermediate portions of the blades to each other.

2. Description of the Related Art

As described in Japanese Patent Application Laid-open No. 2008-82409, a method has conventionally been known in which the following four steps are performed in the manufacturing of an impeller for such a fluid transmitting device. In the first step, the core is disposed horizontally with a concave inner surface of the core facing up in a state where coupling pieces provided to the blades are fitted in positioning holes provided to the core, respectively. In the second step, a brazing material is disposed on the inner surface of the core. In the third step, the brazing material is melt, and the molten brazing material is caused to penetrate into gaps between the coupling pieces and positioning holes that are fitted to each other and further into gaps between the core and the blades. In the fourth step, the molten brazing material having penetrated into the gaps is solidified.

Such a conventional manufacturing method of an impeller for a fluid transmitting device has the following problem. Specifically, in the third step in which the molten brazing material is caused to penetrate into the gaps between the coupling pieces and positioning holes that are fitted to each other and further into the gaps between the core and the blades, the molten brazing material may flow somewhat unevenly on one side, in the radial direction, of the core since it is difficult to dispose the core strictly horizontally. Thus, while the molten brazing material flows into the gaps between the coupling pieces and the positioning holes, the amount of the molten brazing material adhering unnecessarily to the concave inner surface of the core is not small. Such unnecessary adhesion may lower the yield of the brazing material and further impair the rotational balance of the impeller in some cases.

SUMMARY OF THE INVENTION

The present invention has been made in view of such a circumstance and has an object to provide a manufacturing method of an impeller for a fluid transmitting device by which in a step of causing a molten brazing material to penetrate into gaps between coupling pieces and positioning holes that are fitted to each other and further into gaps between a core and blades, the molten brazing material can be efficiently guided to the gaps between the coupling pieces and positioning holes that are fitted to each other, to thereby improve the yield of the brazing material and also to prevent an influence of a residual brazing material over the rotational balance of the impeller.

In order to achieve the object, according to a first aspect of the present invention, there is provided a manufacturing method of an impeller for a fluid transmitting device, the impeller including an annular, bowl-shaped shell, a plurality of blades joined to an inner surface of the shell and arranged in a peripheral direction of the shell, and a core having a convex outer surface brazed to intermediate portions of the blades so as to couple the intermediate portions of the blades to each other, the manufacturing method comprising: a first step of disposing the core horizontally with a concave inner surface of the core facing up in a state where coupling pieces provided to the blades are fitted in positioning holes provided to the core, respectively; a second step of disposing a brazing material on the inner surface of the core; a third step of melting the brazing material and causing the molten brazing material to penetrate into gaps between the coupling pieces and positioning holes that are fitted to each other and further into gaps between the core and the blades; and a fourth step of solidifying the molten brazing material having penetrated into the gaps, wherein a plurality of guide grooves aligned in the peripheral direction to allow communication between adjacent ones of the plurality of positioning holes are provided in the concave inner surface of the core in advance, and in the third step, the molten brazing material is guided to the positioning holes through the plurality of the guide grooves.

According to the first aspect of the present invention, in the third step, the molten brazing material is guided to the positioning holes through the multiple guide grooves previously provided in the inner surface of the core and aligned in the peripheral direction. Therefore, even when the brazing material is disposed somewhat off the guide grooves in the second step, the brazing material, after melting, flows into the guide grooves and then is guided and distributed efficiently to all the positioning holes in the third step. As a result, by capillary action, the molten brazing material penetrates into all the gaps between the positioning holes and the coupling pieces, and further flows down and penetrates into the gaps between the mating surfaces of the core and the blades, thus contributing to the brazing at each spot in an efficient way. Accordingly, almost no brazing material remains in the guide grooves, allowing not only an improvement in the yield of the brazing material but also prevention of an influence of a residual brazing material over the rotational balance of the impeller.

According to a second aspect of the present invention, in addition to the first aspect, the plurality of guide grooves are each formed in an arc shape such that the guide grooves together define an annular shape.

According to the second aspect of the present invention, the guide grooves are capable of smoothly guiding and distributing the molten brazing material to the positioning holes. Moreover, these multiple guide grooves can be formed easily by pressing or cutting.

According to a third aspect of the present invention, in addition to the first or second aspect, each of the guide grooves is formed in a V shape in a transverse cross section.

According to the third aspect of the present invention, it is possible to effectively prevent the molten brazing material from remaining in the guide grooves.

According to a fourth aspect of the present invention, in addition to any one of the first to third aspects, each of the guide grooves is press-molded.

According to the fourth aspect of the present invention, the multiple guide grooves can be all press-molded collectively in the inner surface of the core. Moreover, since the inner surface of each press-molded guide groove is smooth, the guiding of the brazing material through the guide groove to its corresponding positioning holes is smooth. Such smooth guidance is effective in preventing the molten brazing material from remaining in the guide groove.

According to a fifth aspect of the present invention, in addition to any one of the first to fourth aspects, each of the guide grooves includes a plurality of grooves arranged in parallel and allowing communication between the adjacent positioning holes.

According to the fifth aspect of the present invention, each of the guide grooves includes multiple grooves arranged in parallel and allowing communication between the adjacent positioning holes. The groove depth of each of the multiple guide grooves arranged in parallel is set sufficiently smaller than the groove depth in the case where the adjacent positioning holes communicate with each other through a single guide groove, and the molten brazing material is efficiently collected in a larger area and can be guided to the positioning holes. Accordingly, deformation of the impeller due to the formation of the guide grooves can be prevented more securely. This configuration is particularly effective in a case where the portion of the inner surface of the core which appears as a bottom portion when the core is disposed horizontally is relatively flat.

The above and other objects, characteristics and advantages of the present invention will be clear from detailed descriptions of the preferred embodiments which will be provided below while referring to the attached drawings.

BRIEF DESCRIPTION OF THE DRAWINGS

FIGS. 5A to 5C are views explaining a manufacturing process of the turbine impeller;

DESCRIPTION OF THE PREFERRED EMBODIMENTS

Embodiments of the present invention will be described below by referring to the attached drawings.

Figure 1:
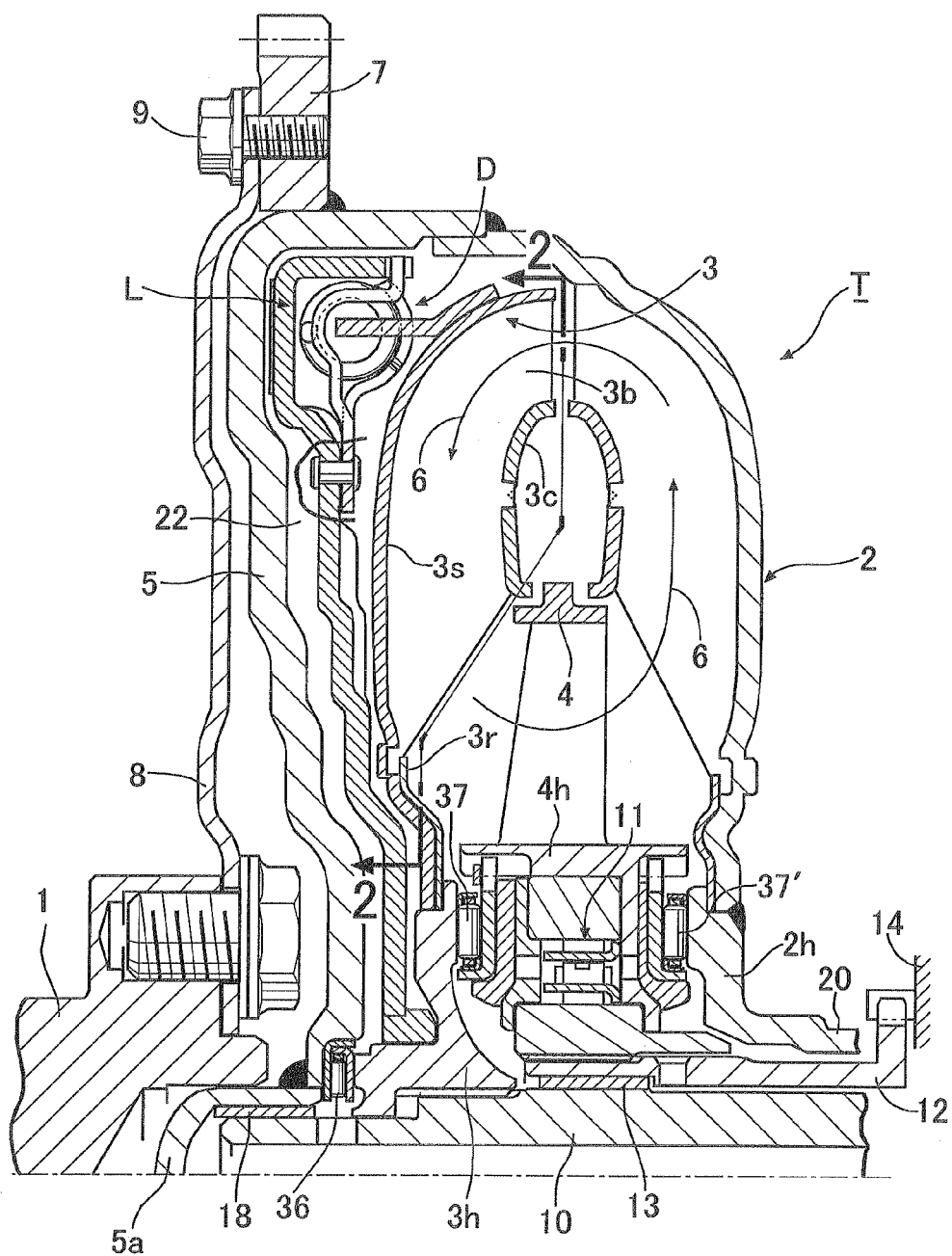
FIG. 1 is a longitudinal sectional side view of a torque converter according to a first embodiment of the present invention.

First of all, a first embodiment of the present invention shown in FIGS. 1 to 5C will be described. In FIG. 1, a torque converter T as a fluid transmitting device includes a pump impeller 2, a turbine impeller 3 disposed facing the pump impeller 2, and a stator impeller 4 disposed between inner peripheral portions of the pump impeller 2 and turbine impeller 3. These three impellers 2, 3, and 4 define therebetween a circulation circuit 6 through which to transmit power by means of hydraulic oil.

A side cover 5 covering the outer surface of the turbine impeller 3 is provided consecutively and integrally by welding to an outer peripheral portion of a shell 2s of the pump impeller 2. A ring gear 7 for starting an engine is welded to the outer peripheral surface of the side cover 5, and a drive plate 8 joined to a crankshaft 1 of the engine is fixed to this ring gear 7 with a bolt 9. A thrust needle bearing 36 is interposed between a hub 3h of the turbine impeller 3 and the side cover 5.

An output shaft 10 aligned coaxially with the crankshaft 1 is disposed in a center portion of the torque converter T. This output shaft 10 is spline-fitted to the hub 3h of the turbine impeller 3 and is rotatably supported on a support tube 5a in a center portion of the side cover 5 through a bearing bush 18. The output shaft 10 serves as a main shaft of an unillustrated multi-stage transmission.

A cylindrical stator shaft 12 supporting a hub 4h of the stator impeller 4 through a freewheel 11 is disposed around the outer periphery of the output shaft 10. A bearing bush 13 is interposed between the output shaft 10 and the stator shaft 12 to permit relative rotation thereof. An outer end portion of the stator shaft 12 is supported on a transmission case 14 in a non-rotatable manner.

Thrust needle bearings 37 and 37' are interposed respectively between the axially opposite end surfaces of the hub 4h of the stator impeller 4 and end surfaces of the hubs 2h and 3h of the pump impeller 2 and turbine impeller 3 facing the end surfaces of the hub 4h. These thrust needle bearings 37 and 37' and the thrust needle bearing 36 restrict axial movements of the turbine impeller 3 and stator impeller 4 between the pump impeller 2 and the side cover 5.

Moreover, an auxiliary drive shaft 20 joined to the pump impeller 2 is disposed around the outer periphery of the stator shaft 12 in such a manner as to be capable of relative rotation. This auxiliary drive shaft 20 drives an oil pump (unillustrated) that supplies hydraulic oil to the torque converter T.

The turbine impeller 3 and the side cover 5 define a clutch chamber 22 therebetween which communicates with the circulation circuit 6 at an outer peripheral side thereof. In this clutch chamber 22, a lock-up clutch L allowing direct coupling of the turbine impeller 3 and the side cover 5 is provided.

Figure 2:
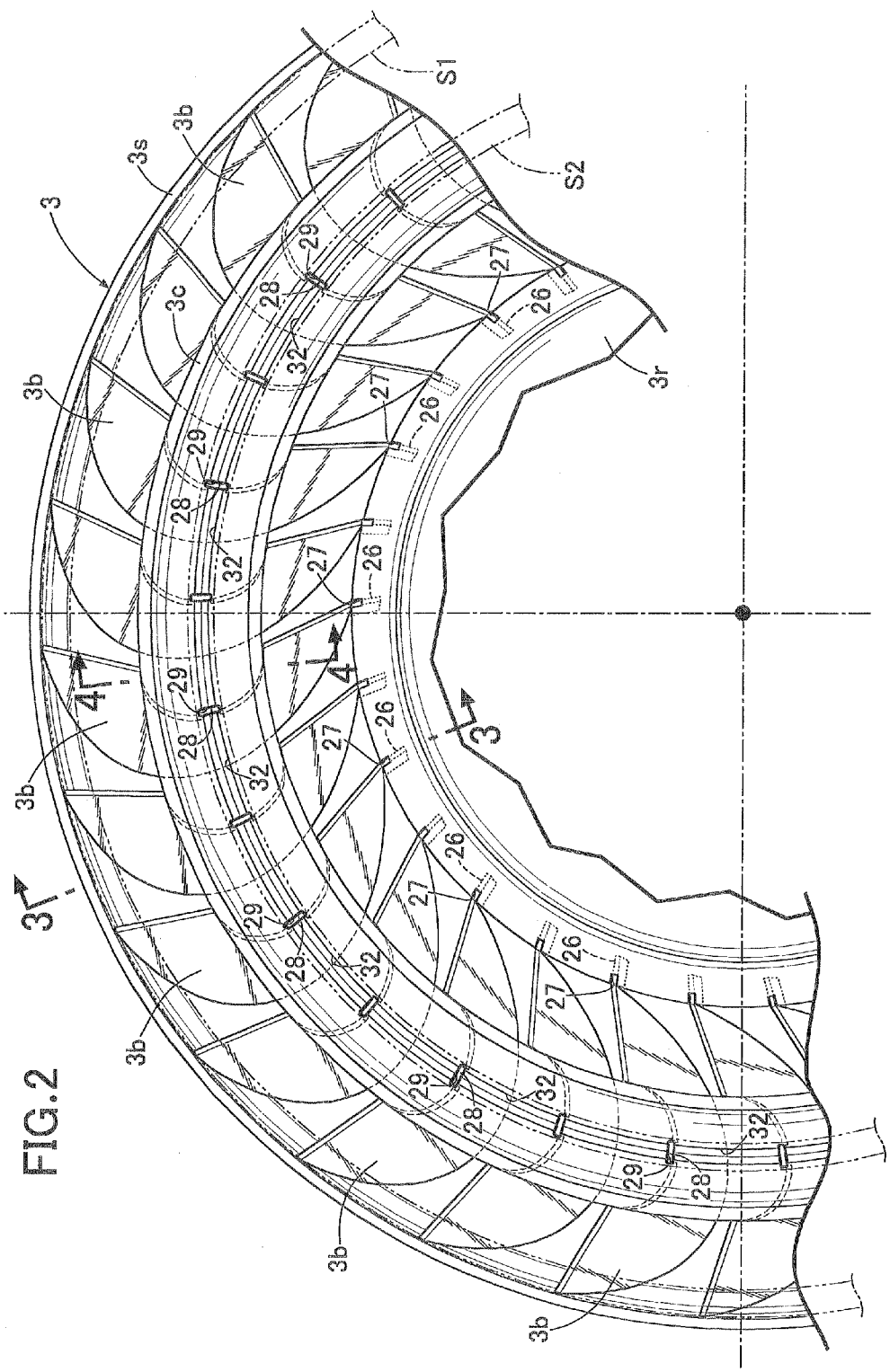
FIG. 2 is a view seen from arrow directions of a line 2-2 in FIG. 1 (a plan view of a part of a turbine impeller).

The turbine impeller 3 will be described in detail by referring to FIGS. 2 and 3.

The turbine impeller 3 is formed of a shell 3s, a number of blades 3b, a retainer plate 3r, and a core 3c. The shell 3s has an annular, bowl shape. The blades 3b are bonded to the inner surface of the shell 3s through a brazing material S1 and arranged at regular intervals in the peripheral direction of the shell 3s. The retainer plate 3r is bonded to the inner surface of the shell 3s through the brazing material S1 to hold a radially inner end portion of each blade 3b. The core 3c has a convex outer surface bonded to an intermediate portion of each blade 3b through a brazing material S2 so as to couple the intermediate portions of the blades 3b to each other. The hub 3h is welded to an inner peripheral edge portion of the shell 3s.

A number of positioning recesses 25 aligned in the peripheral direction are formed in the shell 3s. First coupling pieces 26 formed at the radially inner ends of the blades 3b are engaged with the positioning recesses 25, respectively.

The retainer plate 3r is disposed such that its outer peripheral edge portion would press the first coupling pieces 26 of all the blades 3b toward the positioning recesses 25. Moreover, the retainer plate 3r includes positioning cutouts 27 which the blades 3b are engaged with.

Moreover, a second coupling piece 28 is formed at the edge of each blade 3b that faces the core 3c. A number of positioning holes 29 in which the second coupling pieces 28 of the blades 3b are respectively fitted are bored through the core 3c and arranged in an annular shape. Each positioning hole 29 has a rectangular shape with its long side arranged in the radial direction of the core 3c in conformity with the sectional shape of the second coupling piece 28.

In addition, in the inner surface of the core 3c that is formed in a concave shape, a number of guide grooves 32 are press-molded which are aligned in the peripheral direction to allow communication between the positioning holes 29. In the press-molding, the guide grooves 32 are each formed in an arc shape such that the guide grooves 32 would together define an annular shape. Moreover, the guide grooves 32 are each formed in a V shape in a transverse cross section. When the core 3c is disposed horizontally with its inner surface facing up (see FIGS. 5A to 5C), the bottom of each guide groove 32 is situated in the lowest position in the inner surface.

Moreover, the depth of each guide groove 32 is set to 0.4 mm or below in a case where the thickness of the core 3c is from 0.8 to 2.8 mm. Setting such a depth causes no deformation in the basic form of the core 3c and allows the press-molding of the guide groove 32 with a relatively small load. A purpose and function of the guide groove 32 will be described in description of a manufacturing process of the turbine impeller 3 to be given later.

Figure 3:
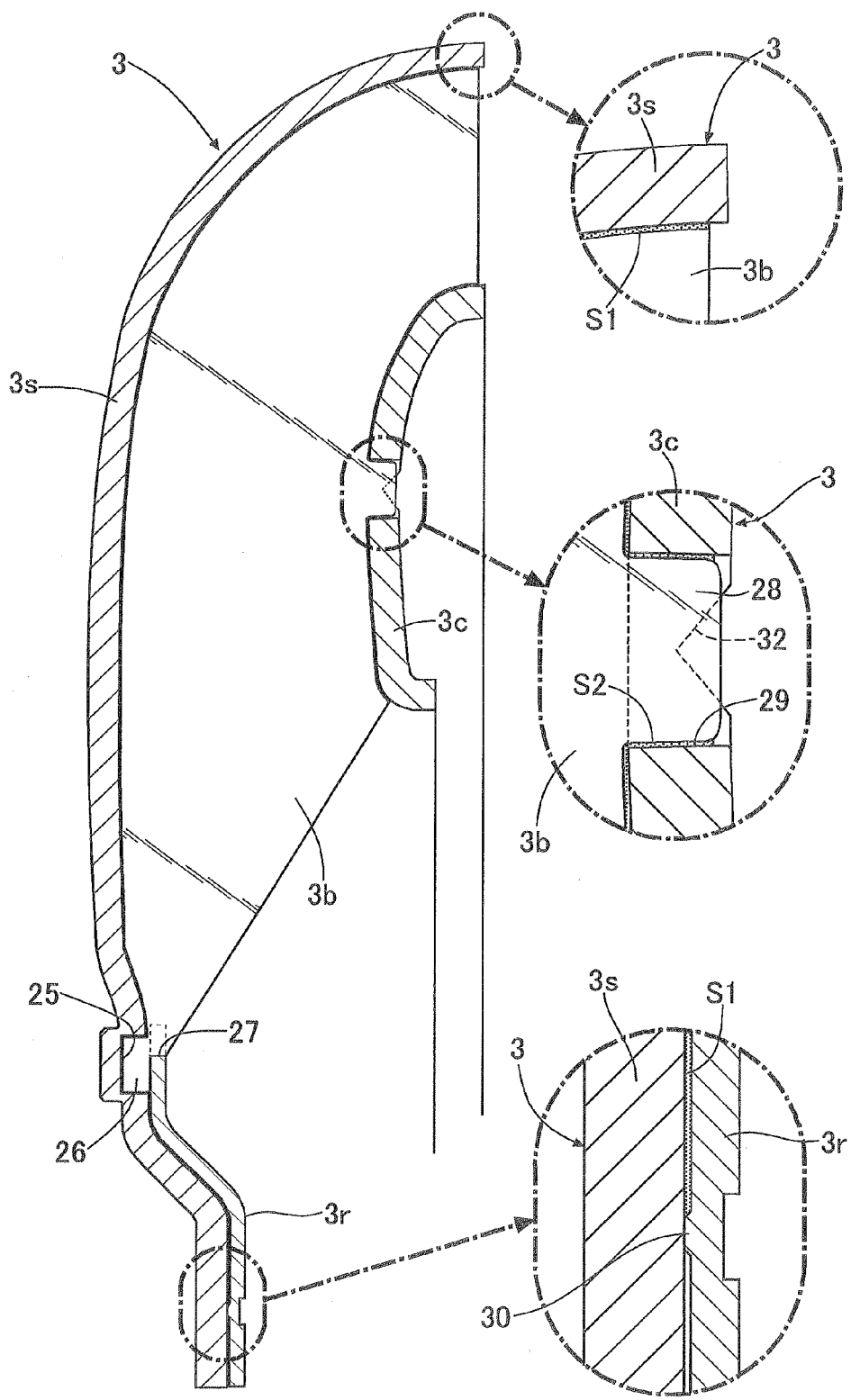
FIG. 3 is an enlarged sectional view taken along a line 3-3 in FIG. 2.
Figure 4:
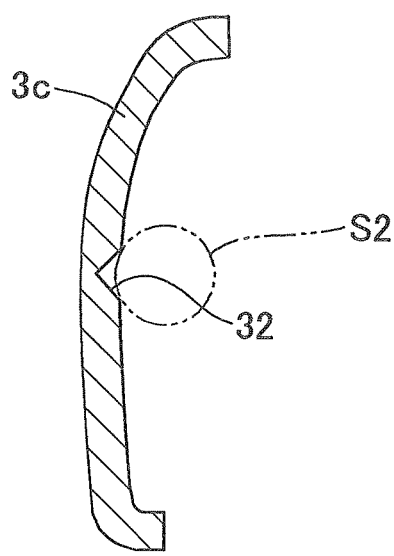
FIG. 4 is an enlarged sectional view taken along a line 4-4 in FIG. 2.

As shown in FIG. 3, an annular projection 30 is formed on one of the mating surfaces of the shell 3s and the retainer plate 3r at a position radially inward of the positioning recesses 25 of the shell 3s. The annular projection 30 is projection-welded to the other mating surface over the entire length in the peripheral direction. The annular projection 30 is configured to prevent the brazing material S1 in a molten state from leaking from the inner peripheral end of the shell 3s in the brazing of the shell 3s and the retainer plate 3r and thereby prevent the brazing material S1 from hampering the welding of the shell 3s and the hub 3h.

Next, the manufacturing process of the turbine impeller 3 will be described by referring to FIGS. 5A to 5C.

First, as shown in FIG. 5A, the shell 3s, the set of blades 3b, the retainer plate 3r, and the core 3c are disposed on top of one another in this order on an assembly jig J placed horizontally. In this step, the first coupling pieces 26 of the blades 3b are engaged with the positioning recesses 25 of the shell 3s, respectively, and the second coupling pieces 28 of the blades 3b are fitted in the positioning holes 29 of the core 3c, respectively. Thereby, the core 3c is disposed horizontally with its concave inner surface facing up.

Thereafter, as shown in FIG. 5B, the brazing material S1 having an annular shape or some other shape is disposed on top of the set of blades 3b.

Moreover, the brazing material S2 having an annular shape or some other shape is disposed on or near the guide grooves 32 in the inner surface of the core 3c. In this step, the brazing material S2 is partially welded to the core 3c to prevent unnecessary movement of the brazing material S2.

Thereafter, the assembly jig J with the shell 3s, the blades 3b, the core 3c, and the like mounted thereon as described above is loaded and heated in a furnace F. Thereby, as shown in FIG. 5C, the brazing material S1 disposed on top of the set of blades 3b melts and penetrates into the gaps between the mating surfaces of the shell 3s, the set of blades 3b, the retainer plate 3r, and the core 3c by capillary action. Here, being welded to the shell 3s over the entire length in the peripheral direction, the annular projection 30 of the retainer plate 3r blocks the molten brazing material S1 from flowing inwardly in the radial direction beyond the projection 30. Accordingly, the brazing material S1 is prevented from entering the gap between the mating surfaces of the shell 3s and the retainer plate 3r inwardly in the radial direction beyond the annular projection 30.

Meanwhile, as the brazing material S2 disposed on or near the guide grooves 32 melts, the molten brazing material S2 first pools in the entire areas of the guide grooves 32, which are situated in the lowest position in the inner surface of the core 3c, and is then guided and distributed equally to all positioning holes 29. As a result, by capillary action, the molten brazing material S2 penetrates into all the gaps between the positioning holes 29 and their respective second coupling pieces 28 and further flows down and penetrates into the gaps between the mating surfaces of the core 3c and the blades 3b.

Subsequently, the assembly jig J is taken out of the furnace F. The brazing operation is complete once the brazing materials S1 and S2 having penetrated into each portion solidify.

By the above steps, the multiple blades 3b and the retainer plate 3r are brazed to the shell 3s, and the core 3c is brazed to the blades 3b, whereby the turbine impeller 3 is assembled.

Note that the inner surface of the core 3c is provided with the multiple guide grooves 32 aligned in the peripheral direction to allow communication between the multiple positioning holes 29, as described above. Therefore, even when the brazing material S2 is disposed somewhat off the guide grooves 32, the brazing material S2, after melting, first flows and pools in the guide grooves 32 and then is guided and distributed efficiently to all the positioning holes 29, and almost no brazing material S2 remains in the guide grooves 32. This results in not only an improvement in the yield of the brazing material S2 but also prevention of an influence of a residual brazing material over the rotational balance of the turbine impeller 3.

Specifically, since the multiple guide grooves 32 are each formed in an arc shape such that the guide grooves 32 would together define an annular shape, the guide grooves 32 are capable of smoothly guiding and distributing the molten brazing material S2 to the positioning holes 29. Additionally, these multiple guide grooves 32 have an advantage that they can be formed easily by pressing or cutting.

Moreover, since each guide groove 32 is formed in a V shape in a transverse cross section, it is possible to effectively prevent the molten brazing material S2 from remaining in the guide groove 32, thereby contributing to an improvement in the yield of the brazing material S2.

Furthermore, in a case of press-molding the guide grooves 32, these multiple guide grooves 32 aligned in the peripheral direction can be all formed collectively. Moreover, since the inner surface of each press-molded guide groove 32 is smooth, the guiding of the brazing material S2 through the guide groove 32 to its corresponding positioning holes 29 is smooth. Such smooth guidance is effective in preventing the molten brazing material from remaining in the guide groove 32.

Figure 6:
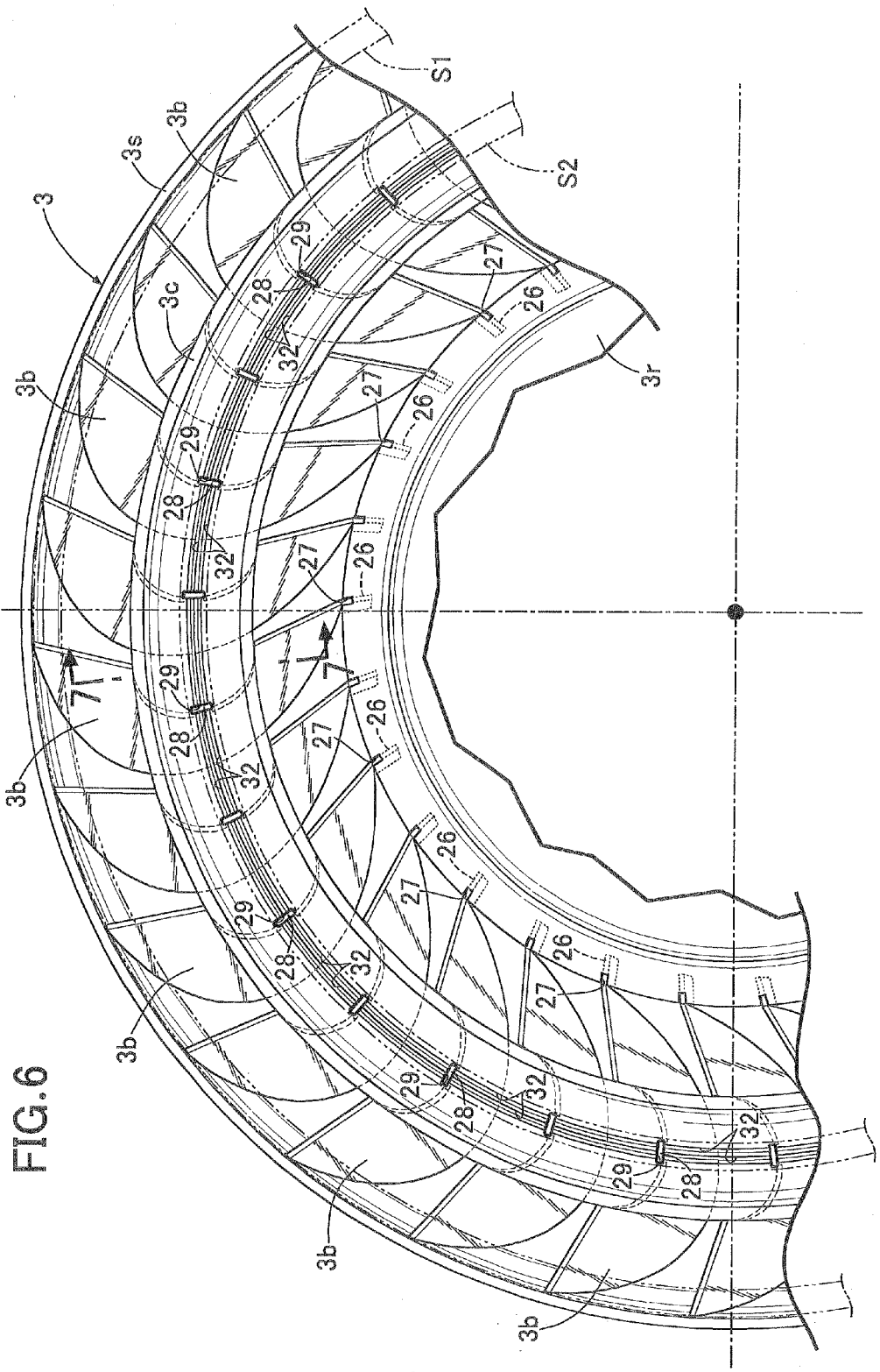
FIG. 6 is a view corresponding to FIG. 2 and showing a second embodiment of the present invention.
Figure 7:
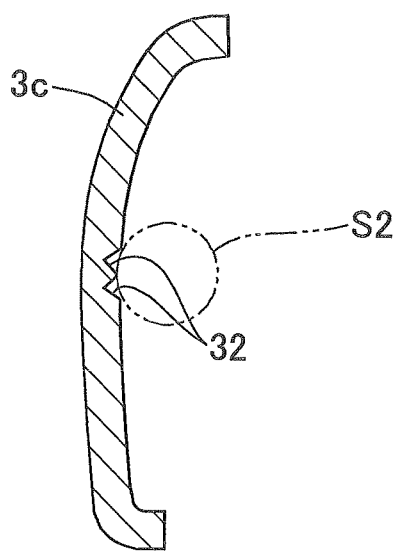
FIG. 7 is an enlarged sectional view taken along a line 7-7 in FIG. 6.

Next, a second embodiment of the present invention shown in FIGS. 6 and 7 will be described.

In the second embodiment, the adjacent positioning holes 29 communicate with each other through multiple guide grooves 32 that are arranged in parallel. In this configuration, the groove depth of each of the multiple guide grooves 32 is set smaller than the groove depth of each guide groove 32 in the previous embodiment. The other features of the configuration are the same as the previous embodiment. Thus, in FIGS. 6 and 7, the portions corresponding to those in the previous embodiment are denoted by the same reference numerals, and overlapping descriptions are omitted.

According to the second embodiment, the groove depth of each of the multiple guide grooves 32 arranged in parallel is set sufficiently smaller than the groove depth in the previous embodiment in which the adjacent positioning holes 29 communicate with each other through a single guide groove 32, and the molten brazing material is efficiently collected in a larger area and can be guided to the positioning holes 29. Accordingly, deformation of the turbine impeller 3 due to the formation of the guide grooves 32 can be prevented more securely. This configuration is particularly effective in a case where the portion of the inner surface of the core 3c which appears as a bottom portion when the core 3c is disposed horizontally is relatively flat.

Note that since having basically the same structure as the turbine impeller 3, the pump impeller 2 may be manufactured by using the same method as described above.

The present invention is not limited to the above embodiments, and various design changes can be made without departing from the gist of the present invention. For example, the brazing materials S1 and S2 before melting may be in any form or of any type such as a wire form, a paste form, or a welding type. Moreover, the present invention is applicable to the manufacturing of a pump impeller and a turbine impeller of a fluid coupling with no stator impeller 4.

What is claimed is:

1. A manufacturing method of an impeller for a fluid transmitting device, the impeller including an annular, bowl-shaped shell, a plurality of blades joined to an inner surface of the shell and arranged in a peripheral direction of the shell, and a core having a convex outer surface brazed to intermediate portions of the blades so as to couple the intermediate portions of the blades to each other, the manufacturing method comprising:
a first step of disposing the core horizontally with a concave inner surface of the core facing up in a state where coupling pieces provided to the blades are fitted in positioning holes provided to the core, respectively;
a second step of disposing a brazing material on the inner surface of the core;
a third step of melting the brazing material and causing the molten brazing material to penetrate into gaps between the coupling pieces and positioning holes that are fitted to each other and further into gaps between the core and the blades; and
a fourth step of solidifying the molten brazing material having penetrated into the gaps, wherein
a plurality of guide grooves aligned in the peripheral direction to allow communication between adjacent ones of the plurality of positioning holes are provided in the concave inner surface of the core in advance, and
in the third step, the molten brazing material is guided to the positioning holes through the plurality of the guide grooves.

2. The manufacturing method of an impeller for a fluid transmitting device according to claim 1, wherein the plurality of guide grooves are each formed in an arc shape such that the guide grooves together define an annular shape.

3. The manufacturing method of an impeller for a fluid transmitting device according to claim 2, wherein each of the guide grooves is formed in a V shape in a transverse cross section.

4. The manufacturing method of an impeller for a fluid transmitting device according to claim 3, wherein each of the guide grooves includes a plurality of grooves arranged in parallel and allowing communication between the adjacent positioning holes.

5. The manufacturing method of an impeller for a fluid transmitting device according to claim 3, wherein each of the guide grooves is press-molded.

6. The manufacturing method of an impeller for a fluid transmitting device according to claim 5, wherein each of the guide grooves includes a plurality of grooves arranged in parallel and allowing communication between the adjacent positioning holes.

7. The manufacturing method of an impeller for a fluid transmitting device according to claim 2, wherein each of the guide grooves is press-molded.

8. The manufacturing method of an impeller for a fluid transmitting device according to claim 7, wherein each of the guide grooves includes a plurality of grooves arranged in parallel and allowing communication between the adjacent positioning holes.

9. The manufacturing method of an impeller for a fluid transmitting device according to claim 2, wherein each of the guide grooves includes a plurality of grooves arranged in parallel and allowing communication between the adjacent positioning holes.

10. The manufacturing method of an impeller for a fluid transmitting device according to claim 1, wherein each of the guide grooves is formed in a V shape in a transverse cross section.

11. The manufacturing method of an impeller for a fluid transmitting device according to claim 10, wherein each of the guide grooves includes a plurality of grooves arranged in parallel and allowing communication between the adjacent positioning holes.

12. The manufacturing method of an impeller for a fluid transmitting device according to claim 10, wherein each of the guide grooves is press-molded.

13. The manufacturing method of an impeller for a fluid transmitting device according to claim 12, wherein each of the guide grooves includes a plurality of grooves arranged in parallel and allowing communication between the adjacent positioning holes.

14. The manufacturing method of an impeller for a fluid transmitting device according to claim 1, wherein each of the guide grooves is press-molded.

15. The manufacturing method of an impeller for a fluid transmitting device according to claim 14, wherein each of the guide grooves includes a plurality of grooves arranged in parallel and allowing communication between the adjacent positioning holes.

16. The manufacturing method of an impeller for a fluid transmitting device according to claim 1, wherein each of the guide grooves includes a plurality of grooves arranged in parallel and allowing communication between the adjacent positioning holes.

* * * * *